United States Patent Office 3,548,664
Patented Dec. 22, 1970

3,548,664
RESTRAINED GYROSCOPE FOR STEERING PURPOSES
Waldemar Moller, Steigen, Germany, assignor to Bodenseewerk Geratetechnik GmbH., a corporation of Germany
Filed Apr. 10, 1967, Ser. No. 629,480
Claims priority, application Germany, May 3, 1966, F 49,099
Int. Cl. G01c 19/04
U.S. Cl. 74—5.5                                 7 Claims

ABSTRACT OF THE DISCLOSURE

In a gyroscopic control arrangement for use for example in aircraft, a gyroscope is pivotally mounted about an axis of precession and a pneumatic restraining and damping means for the gyroscope is provided and includes first and second compression chambers intercoupled by a fluid flow damping restrictor. The first chamber has a relatively smaller volume with respect to the second chamber. Means such as a piston are positioned in the first chamber and coupled to the housing for displacing a volume of air in the first chamber in accordance with motion of the gyroscope about an axis of precession.

---

This invention relates to gyroscopic steering control arrangements and more particularly to means for restraining and damping the motion of a gyroscope about an axis thereof.

In various control arrangements utilizing a gyroscope, such as are employed with aircraft for example, it is desirable to restrain the motion of the gyroscope about one of its axes. As is well known, a restraining means functions to provide a variable force opposed to the torque of the gyroscope about its precession axis, and permits the measurement of, or, an indication of the magnitude of the torque. One known form of restraining device employs pneumatic effects and utilizes the compression of a volume of gas such as air for fettering the motion of the gyroscope. In a particular arrangement, a gyroscope housing is rotatably supported about the precession axis and a piston rod is hinged on each side of the housing. A piston mounted on each piston rod is positioned in a cylinder having a fluid flow restricting outlet. These cylinders are adapted to contain a relatively large volume of air. The volume of air functions as a compressible air cushion or spring and no further restraint of the gyroscope such as by springs or the like is provided. A pneumatic restraining arrangement of this type is described in U.S. Pat. No. 3,142,181, which is assigned to the assignee of the present application.

When the gyroscope, restrained in such a manner, is subjected to an angular velocity about an axis of measurement, the gyroscope exhibits a torque about the precession axis. This torque first is effective to cause a compression of the air in one cylinder and an expansion of the air in the other cylinder and thus a deflection of the gyroscope about the precession axis proportional to the angular velocity $\omega$. The compression and expansion of the air, however, also causes a proportional air flow through the cylinder outlet restrictors. The pistons and the gyroscope are thereby deflected further at a velocity proportional to the torque about the precession axis and accordingly to the angular velocity $\omega$ about the axis of measurement. The total deflection of the gyroscope about the precession axis is therefore equal to the rate of turn plus the time interval thereof:

$$A = C_1 \omega + C_0 \int \omega dt$$

A corresponding electrical signal may be developed, picked off with a suitable pickup arrangement, and applied to a control arrangement. The constant $C_1$ is determined by the volume of the air cushion, and the constant $C_0$ is determined by the adjustment of the restrictor openings. These constants are determined by the requirements of the control loop and selection of the cylinder volumes and restrictor openings are necessarily dependent thereon.

In addition to the indicated restraint on the motion of the gyroscope, it is also desirable to provide means for damping undesired oscillations of the gyroscope.

However, in view of the relatively large difference in volumes required for pneumatic restraint and damping, it was not possible in prior arrangements to take into consideration the requirements for both gyroscope restraint and damping. Damping in a pneumatic arrangement of the type described occurs, to some degree, but only as a secondary effect. The pneumatic damping effect is relatively small because of the relatively large compression volume and the narrow adjustment required for the integration restrictor below a value of .1. A more desirable gyroscope damping exists between the range of .7 and 1.0. Therefore, the prior pneumatic restraining systems have not been damped to the degree desirable.

Accordingly, it is an object of this invention to provide an improved arrangement for affecting both pneumatic restraint and damping of a gyroscope.

Another object of the invention is to provide a pneumatic restraining means for a gyroscope which is adapted particularly for use with a control loop and, in addition a pneumatic damping means which exhibits improved damping characteristics.

A further object of the invention is to provide a pneumatic gyroscope restraining means adapted to the requirements of a control loop and which provides for improved damping of the system.

In accordance with features of the present invention, a pneumatic restraining and damping means for a gyroscope includes two compression chambers intercoupled by a fluid flow damping restrictor. A first compression chamber of the arrangement comprises a damping chamber and has a relatively smaller volume than the second compression chamber. A gaseous volume of the first chamber is directly operated upon by the gyroscope and thereby serves for damping. It can be selected more favorably in view of its smaller volume. Damping is affected by forcing air from the first compression chamber into the second compression chamber through the fluid flow restrictor interposed therebetween. The second compression chamber which, along with the volume of the first chamber acts as an air spring, includes an outlet integrating restrictor. The damping restrictor exhibits a substantially smaller fluid flow resistance than that provided by the outlet integrating restrictor. The use of these volumes and of the damping restrictor provides an additional degree of freedom, permitting the independent selection of $C_1$, $C_0$ and the damping factor.

In addition, with an arrangement of the type indicated, the integrating, restraining and damping system can comprise a unit which can be examined independently of the gyroscope and can then be hinged on the gyroscope. By exchanging the compression chambers, the restraining force (constant $C_1$) can be adapted to given conditions.

In prior pneumatic restraining arrangements, the use and adjustment of the restrictors employed therein required a relatively high degree of precision. The use of such restrictors was accompanied by the danger that such fine restrictors would be clogged by dust or the like and the flow resistance thereof would be substantially affected. In accordance with another embodiment of this invention, a restrictor is formed of air permeable sinter material.

These and other objects and features of the invention will become apparent with reference to the following specifications and drawings wherein.

Figure 1:
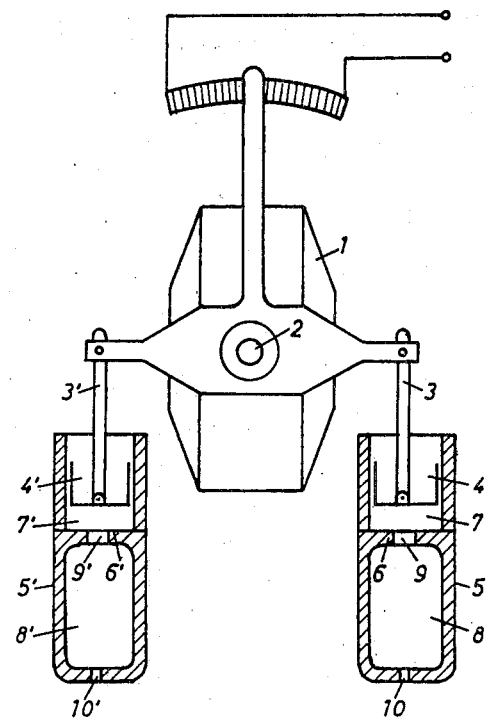
FIG. 1 illustrates a gyroscopic control arrangement constructed in accordance with the present invention.

In FIG. 1, reference numeral 1 designates a gyroscope, the spin axis of which extends in the paper plane from the right to the left thereof. The axis of measurement extends in the paper plane from the top downwardly. The gyroscope with its housing is supported pivotally about the precession axis 2 which is perpendicular to the paper plane. Piston rods 3, 3′ are hinged on the gyroscope housing 1 on both sides of the precession axis, having mounted thereon pistons 4, 4′. These pistons 4, 4′ slide in cylinders 5, 5′. Each of the cylinders 5, 5′ is divided into two compression chambers 7 and 7′, respectively, and 8 and 8′, respectively, by a partition wall 6 and 6′, respectively. The compression chambers are adjoining and pneumatically intercoupled via damping restrictor openings 9 and 9′, respectively. The compression chambers 8 and 8′, respectively, are formed with integrating restrictor openings 10 and 10′, respectively.

The volumes of chambers 7 and 7′, respectively, are substantially smaller than that of chambers 8 and 8′, respectively. Each of the restrictors 9 and 9′ have a flow resistance equal to about 2% to 4% of the restricting resistance of the integrating restrictors 10 and 10′, respectively. The chambers 7 and 7′, respectively, with the restrictors 9 and 9′, respectively, substantially effect the damping. The chambers 8 and 8′, respectively, with the restrictor openings 9 and 9′, respectively, effect the restraint and integration.

Figure 2:
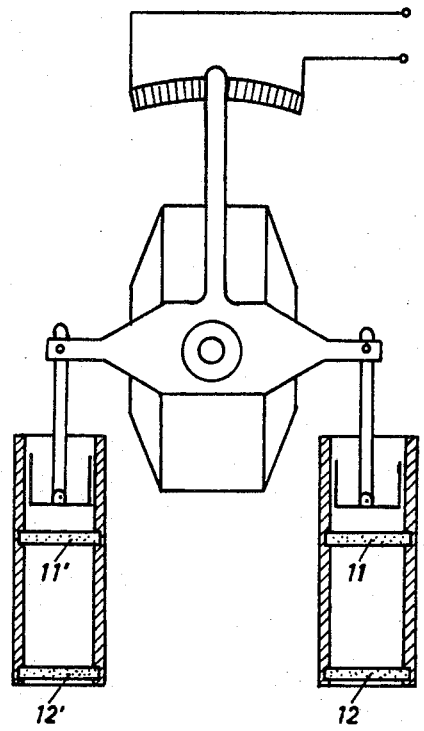
FIG. 2 illustrates a gyroscope control arrangement constructed in accordance with another embodiment of the present invention.

In the arrangement according to FIG. 2, the restrictors 9 and 9′, respectively, and the integrating restrictors 10 and 10′, respectively, are replaced by discs 11, 11′ and 12, 12′ of sinter material which offer flow resistance yet is permeable by air.

Figure 3:
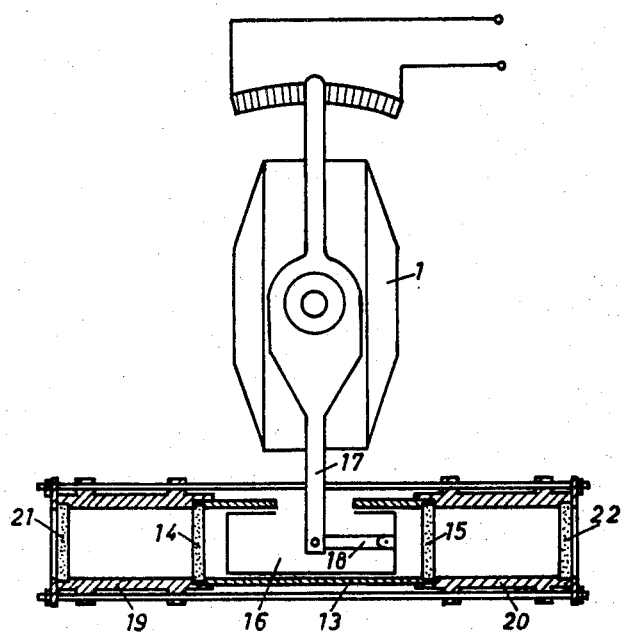
FIG. 3 illustrates a further embodiment of the invention wherein the damping, restraining and integrating elements are combined to form one unit closed in itself and wherein the compression chambers are exchangeable.

In the arrangement according to FIG. 3, a cylinder 13 is provided which is closed off at both ends thereof by discs 14 and 15 of sinter material which offers flow resistance yet is permeable by air. These discs 14 and 15 constitute the damping restrictors. The cylinder 13 has sliding therein a double-acting piston 16 being hinged on the gyroscope 1 via an arm 17 and a guide rod 18. The ends of the cylinder 13 have exchangeably mounted thereon the cylindrical compression chambers 19, 20 with discs 21, 22 of sinter material as integrating restrictors.

While I have illustrated and described a particular embodiment of my invention, it will be understood that various modifications may be made therein without departing from the spirit of the invention.

What is claimed is:

1. In a gyroscope control arrangement:
   a gyroscope pivotally mounted about an axis of precession;
   pneumatic restraining means for restraining the motion of the gyroscope about said axis;
   said restraining means including first and second chambers interconnected by a first damping fluid flow restrictive means arranged for conveying a fluid from said first to said second chamber; and
   means for displacing a volume of fluid in said first chamber in accordance with the position of said gyroscope about the axis of precession.

2. The apparatus of claim 4 wherein said first chamber has a substantially smaller volume than said second chamber.

3. The apparatus of claim 1 including an outlet integrating restrictor positioned in said second chamber.

4. The apparatus of claim 3 wherein said damping responsive means has a substantially smaller flow resistance than said outlet restrictor.

5. The apparatus of claim 1 wherein said chambers comprise cylinders and said means for displacing a volume of air in said first chamber comprises a piston coupled to said housing.

6. The apparatus of claim 1 wherein said damping restrictive means comprises a disc of sinter material which is permeable by air.

7. The apparatus of claim 5 wherein said air displacing means comprises a double-acting piston adapted to slide in cylinders having restrictors provided in walls thereof and the cylinders are exchangeably mounted on both sides thereof.

References Cited

UNITED STATES PATENTS

| | | | |
|---|---|---|---|
| 2,070,923 | 2/1937 | Richter | 33—226 |
| 3,142,181 | 7/1964 | Moller | 74—5.5X |
| 2,426,213 | 8/1947 | Herondelle | 74—5.5 |

FRED C. MATTERN, JR., Primary Examiner

M. A. ANTONAKAS, Assistant Examiner